Oct. 30, 1962 — J. BAJER ET AL — 3,061,301
ISOLATING DEVICE FOR SUSPENSION SYSTEM
Filed June 30, 1960 — 3 Sheets-Sheet 1

JACQUES BAJER
HERMAN C. CUSKIE
INVENTORS

BY John R. Faulkner
Clifford L. Sadler

ATTORNEYS

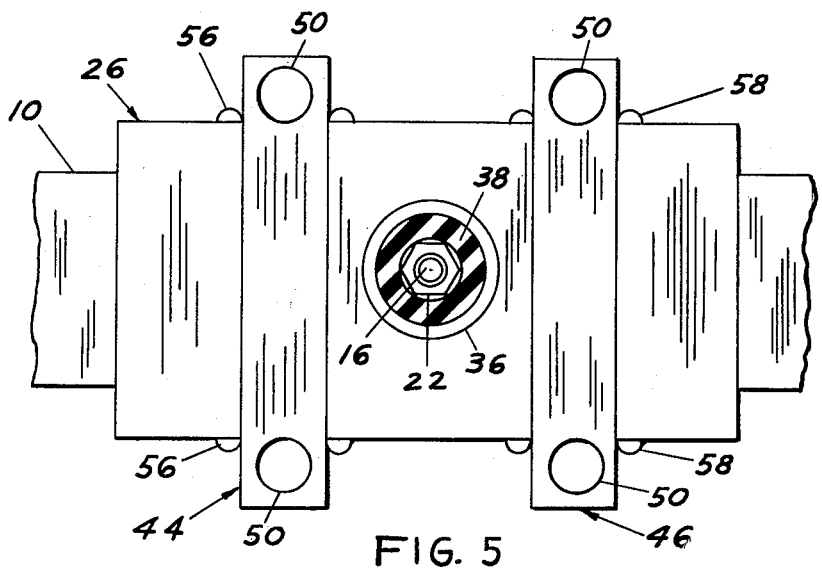
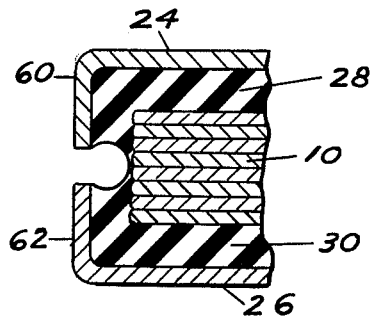
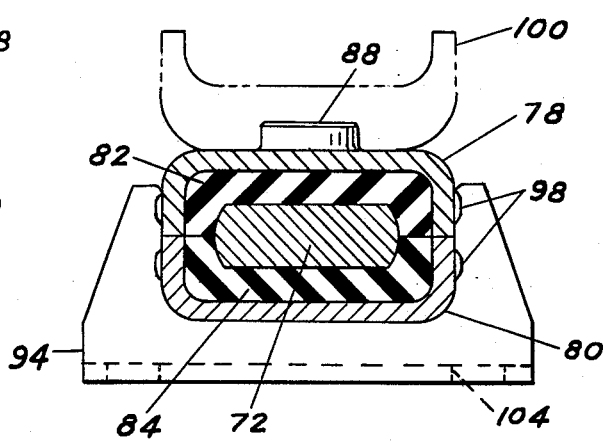

Oct. 30, 1962    J. BAJER ET AL    3,061,301
ISOLATING DEVICE FOR SUSPENSION SYSTEM
Filed June 30, 1960    3 Sheets-Sheet 3

JACQUES BAJER
HERMAN C. CUSKIE
INVENTORS
BY John R. Faulkner
Clifford L. Sadler
ATTORNEYS

United States Patent Office 3,061,301
Patented Oct. 30, 1962

3,061,301
ISOLATING DEVICE FOR SUSPENSION SYSTEM
Jacques Bajer, Dearborn, and Herman C. Cuskie, Birmingham, Mich., assignors to Ford Motor Company, Dearborn, Mich., a corporation of Delaware
Filed June 30, 1960, Ser. No. 39,975
4 Claims. (Cl. 267—52)

The present invention relates to a vehicle suspension system and more particularly to means for connecting an axle housing to an elongated leaf spring.

It is common practice in motor vehicle construction to have a pair of parallel longitudinally extending leaf springs that are associated with an axle housing and to have a rigid supporting connection between the springs and the housing. Unfortunately, with this arrangement road shocks and vibrations occurring at the wheels are transferred directly from the axle housing to the leaf springs. As the springs are connected to the passenger carrying vehicle body such transmission of vibration is objectionable.

The present invention provides an improvement in means for connecting leaf springs to axle housings so that minor road shocks will be dampened and isolated from the passenger compartment. More specifically, the present invention provides a clamping device with an intermediate isolating rubber member to secure the leaf spring to the axle housing. This construction provides a flexible mounting to isolate axle noise and vibration. The clamping device is so fabricated that the rubber is preloaded to a determined limit and the attaching bolts that secure the assembly to the axle housing do not come into direct contact with the springs. This latter feature eliminates noise and conductance.

Furthermore objects and advantages of the present invention will become apparent from the following description and the accompanying drawings, in which:

FIGURE 3 is a partial view of the clamp shown in FIGURE 2 prior to the preloading of the rubber;

FIGURE 5 is a bottom plan view of the clamp;

FIGURE 8 is an elevational view partly in section of the modified clamp, and;

Figure 1:
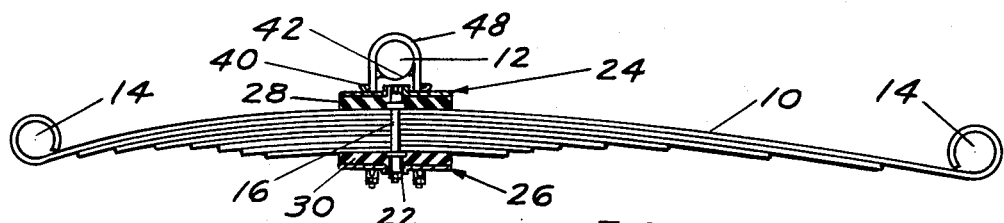
FIGURE 1 is a side elevational view of a leaf spring secured to an axle housing by a clamping device of the present invention.
Figure 4:
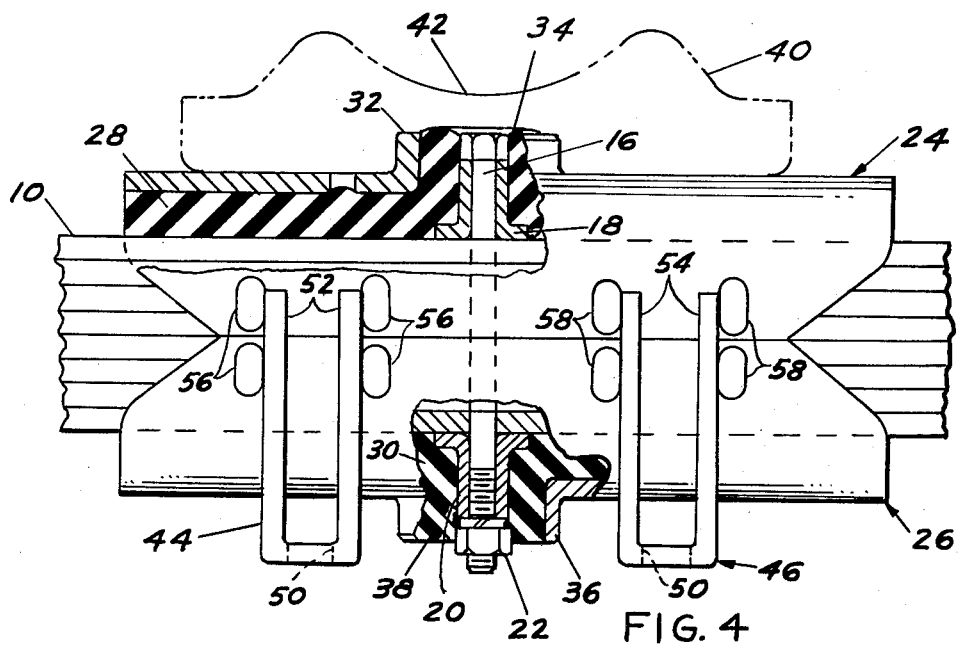
FIGURE 4 is a side elevational view partly in section.

Referring now to the drawings for a more detailed description of the present invention, wherein like reference numerals identify like parts throughout the various views, a multi-leaf spring 10 is shown in FIGURE 1 secured to an axle housing or tube 12.

The spring 10 is formed of a plurality of elongated spring metal leaves. The upper leaf is provided with eyes 14 for attachment to fore and aft brackets situated on a vehicle chassis.

The leaves of spring 10 have holes that are vertically aligned to receive a pilot bolt 16. An upper hat-shaped spacer 18 is interposed between the head of the bolt 16 and the top leaf of the spring 10. The lower hat-shaped spacer 20 separates the lower spring leaf from the nut 22 of the bolt 16. The bolt 16 serves to position the leaves of the spring 10 in transverse and longitudinal alignment. The bolt 16 is situated vertically beneath the center of the axle tube 12.

Channel-shaped upper and lower clamp members 24 and 26 are located about the leaves 10. Upper and lower channel-shaped isolating rubber members 28 and 30 are interposed between the interior of the clamps 24, 26 and about the spring 10. The rubber pieces 28, 30 may be bonded to the interior of the clamps 24, 26 and also to the contacted surface of the spring leaves 10.

The upper clamp 24 is provided with a cylindrical opening 32 concentric with the axis of the bolt 16. Similarly, the rubber member 28 has an upstanding cylindrical protrusion 34 interposed between the pilot bolt 16 and the interior of the cylinder 32. The rubber in this area is bonded to the spacer 18.

The lower clamp 26 and rubber 30 are similarly constructed to have concentric depending portions 36 and 38 surrounding the lower spacer 20.

A mounting bracket 40 is welded to the upper clamp 24 and is provided with a U-shaped upstanding contour 42 to saddle the axle housing 12. The lower clamp 26 has a pair of spaced apart U-shaped sheet metal brackets 44 and 46 that receive U-bolts 48 to secure the assembly. The assembly of the unit is completed by placing the axle tube 12 in the saddle 42 and positioning the U-bolts 48 about the tube 12 with their ends depending. The lower ends of the U-bolts are secured through holes 50 provided in the brackets 44, 46.

The brackets 44, 46 have upstanding side portions 52, 54 that extend above the lower clamp 46. Upper portions 52, 54 cooperate with pairs of aligning protrusions 56 and 58 of the upper and lower clamps 24, 26. By placing the ends 52, 54 of the brackets 44, 46 between the protrusions 56, 58, the upper and lower clamps 24, 26 are properly located. In addition, this locates the brackets 44, 46 relative to the axle tube 12 resting in the saddle 42.

Referring to FIGURE 3 the relative position of the elements of the clamp assembly are seen prior to their being secured to an axle tube 12. In this view, the upper and lower channel-shaped rubber pieces 28, 30 are in an unstressed condition. When the upper and lower clamps 24 and 26 are brought together by the tightening of U-bolts 48 the rubber 28, 30 is compressed.

Figure 2:
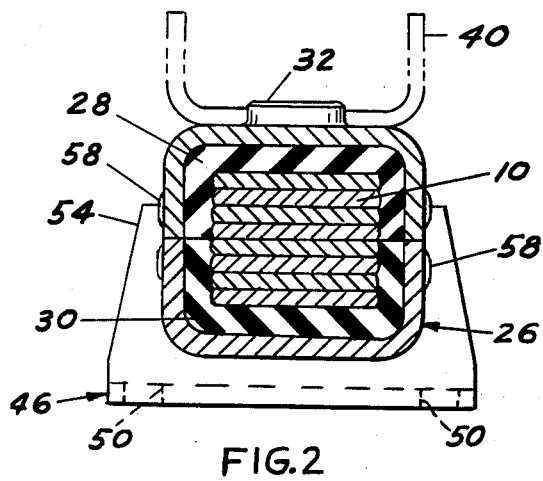
FIGURE 2 is an elevational view in section of the clamping device.

With the construction of the present invention, the compression of the isolation rubber is set to a predetermined maximum. This is achieved by the dimensioning of the side flanges 60 and 62 of the clamps 24, 26. By drawing the clamps 24 and 26 together, the rubber 28, 30 is compressed until the edges of the flanges 60, 62 meet. As these elements limit further movement, additional stressing of the rubber 28, 30 is not possible. When the clamp is assembled and the U-bolts 48 tightened, the isolation rubber 28, 30 assumes a preloaded condition as seen in FIGURE 2.

The foregoing structure provides an effective connection between the axle tube and the leaf springs. The rubber members 28 and 30 efficiently dampen the transmission of objectionable vibrations. The clamp assembly is constructed so that the isolation of vibrations is achieved by preloading the rubber to an appropriate value. The U-bolts and other metallic members that contact the axle housing do not touch the leaf springs 10. There is a complete interposition of rubber between the leaf springs and the axle bracket.

Figure 6:
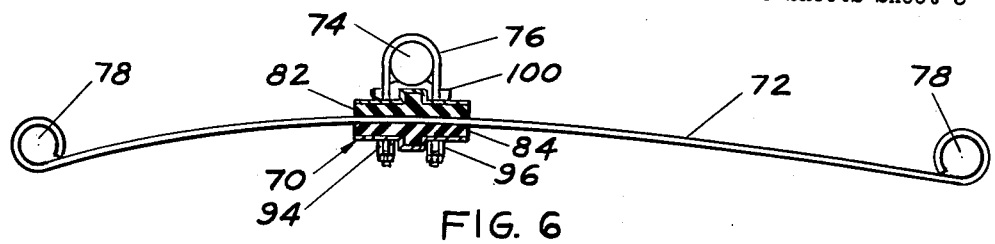
FIGURE 6 is a side elevational view of a modification of the present invention.

A modification of the foregoing embodiment is disclosed in FIGURE 6, where a clamping device 70 is secured to a single leaf spring 72. The clamp 70 is attached to an axle tube 74 by U-bolts 76. The spring 72 is provided with fore and aft attaching eyes 78 for connection with the vehicle chassis.

Figure 7:
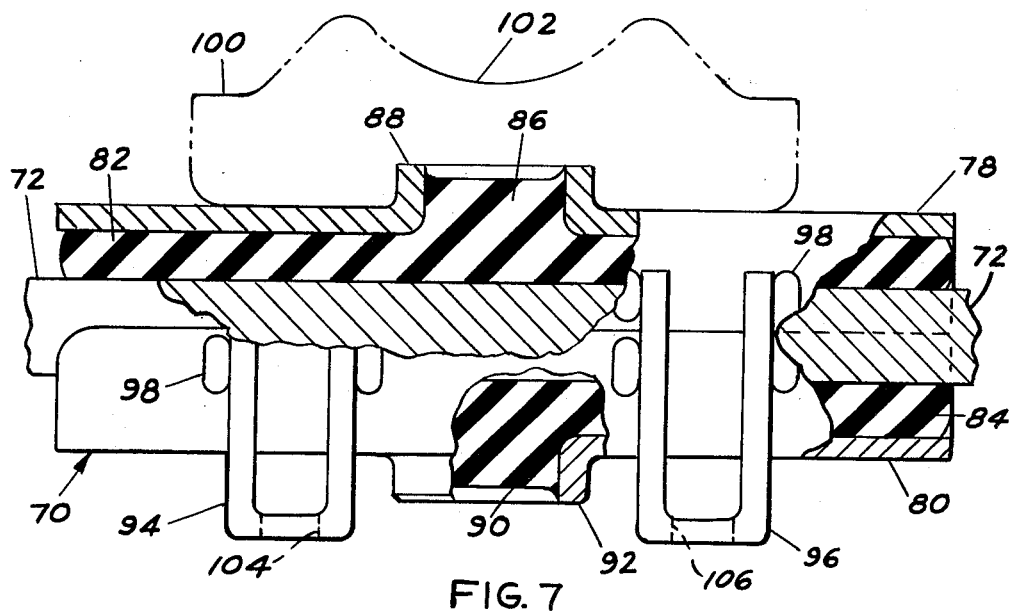
FIGURE 7 is an enlarged view of the clamp of FIGURE 6.
Figure 9:
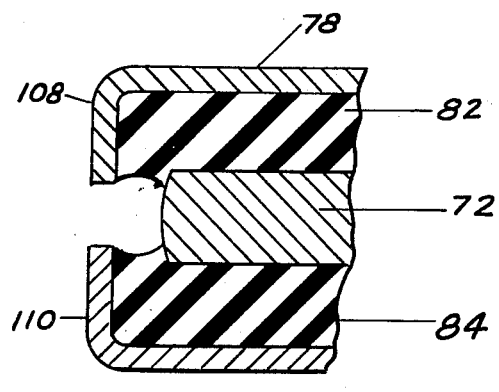
FIGURE 9 is a partial view corresponding to FIGURE 8 prior to the preloading of the rubber.

The construction of the clamp 70 shown in FIGURES 6 to 8 is similar to that associated with the multi-leaf spring embodiment except that a pilot bolt is not employed. The clamp assembly 70 consists of upper and lower channel-shaped members 78 and 80 that are positioned face-to-face about the leaf spring 72.

A pair of upper and lower channel-shaped rubber pieces 82 and 84 are interposed between the clamps 78, 80 and about the spring 72. The upper and lower surfaces of the rubber pieces 82, 84 are bonded to the inner surfaces of the channel members 78, 80 and to the spring 72 that they surround. The upper rubber member 82 is provided with a protrusion 86 that extends through a cylindrical opening 88 formed in the upper surface of the clamp 78. Similarly, a depending protrusion 90 is associated with a cylindrical portion 92 of lower clamp 80.

Mounting brackets 94 and 96 for connection with the U-bolts 76 are identical in construction to the brackets 44, 46 of the structure of FIGURE 2. The brackets 94, 96 cooperate with aligned buttons or protrusions 98 provided on the sides of the upper and lower clamps 78, 80.

A bracket 100 is welded to the upper clamp 78 and has a saddle-shaped portion 102 in which the axle tube 74 rests. U-bolts 76 surround the axle tube 74 and have their depending ends extend through holes 104 and 106 in the brackets 94, 96. Tightening of the U-bolts 76 secures the clamping assembly 70 together and rigidly to the axle tube 74.

In addition, the tightening of the U-bolts 76 preloads the rubber elements 82, 84. This preload is determined by the dimensions of side flanges 108 and 110 carried by the clamps 78, 80. When they are drawn together as seen in FIGURE 8 the rubber 82, 84 is compressed until the ends of the flanges 108, 110 meet.

This construction provides an effective attachment means for securing a leaf spring to an axle housing and eliminates metal-to-metal contact of brackets and clamping devices with the leaf spring. This embodiment and the previously described embodiment function as a high frequency noise isolation device and harshness reduction means. Further, fore and aft movement of the axle for wheel compliance will be obtained with longitudinal shear displacement of the rubber.

The foregoing description constitutes the preferred embodiment of the present invention; however, modifications and alternate structures may occur to those skilled in the art which will come within the scope and spirit of the following claims.

We claim:
1. In a suspension device for connecting a stacked set of longitudinally extending leaf springs to an axle housing, a vertical bolt located through said springs, upper and lower channel-shaped rubber members surrounding said springs, upper and lower channel-shaped clamps surrounding said rubber members, said rubber members and clamps having vertically extending cylindrical concentric portions surrounding the ends of said bolt, said clamps having mating side flanges dimensioned to preload said rubber members when brought together, means for drawing said clamps together and securing said clamps rigidly to said axle housing, said means including a pair of retaining members engaging said lower clamp, said retaining members having leg portions extending vertically to overlap the juncture of said upper and lower clamps, a saddle member positioned upon said upper clamp, said axle housing riding on said saddle member, U-bolt means encircling said axle housing and engaging said retaining members.

2. In a suspension device for connecting a longitudinally extending leaf spring to an axle housing, a vertical bolt located through said springs, upper and lower channel-shaped rubber members surrounding said springs, upper and lower channel-shaped clamps surrounding said rubber members, said rubber members and said clamps having vertically extending concentric portions surrounding the ends of said bolt, said clamps having mating side flanges in butting engagement, said rubber members being preloaded in compression, means for maintaining said clamps in engagement and for securing said clamps rigidly to said axle housing, said means including a pair of retaining members engaging said lower clamp, said retaining members having leg portions extending vertically to overlap the juncture of said upper and lower clamps, a saddle member resting upon said upper clamp, said axle housing riding on said saddle member, said U-bolt means encircling said axle housing and engaging said retaining members.

3. In a suspension device for connecting a longitudinally extending leaf spring to an axle housing, a vertical bolt located through said springs, a cylindrical collar surrounding the ends of said bolt, upper and lower channel-shaped rubber members surrounding said springs, upper and lower channel-shaped clamp members surrounding said rubber members, said rubber and clamp members having vertically extending concentric portions surrounding said collar, said clamp members having engaging side flanges preloading said rubber members in compression, means for maintaining said clamp members in engagement and for securing said clamp members rigidly to said axle housing, said means including a pair of retaining members engaging said lower clamp member, said retaining members having leg portions extending vertically to overlap the juncture of said upper and lower clamp members, a saddle member resting upon said upper clamp member, said axle housing riding on said saddle member, said U-bolt means encircling said axle housing and engaging said retaining members.

4. In a suspension device for connecting a longitudinally extending leaf spring to an axle housing, upper and lower channel-shaped rubber members surrounding said springs, upper and lower channel-shaped clamps surrounding said rubber members, said rubber members and said clamps having vertically extending concentric portions, said clamps having engaging side flanges preloading said rubber members, means for holding said clamps in engagement and securing said clamps rigidly to said axle housing, said means including a pair of retaining members engaging said lower clamp, said retaining members having leg portions extending vertically to overlap the juncture of said upper and lower clamps, a saddle member resting upon said upper clamp, said axle housing riding on said saddle member, U-bolts encircling said axle housing and engaging said retaining members.

References Cited in the file of this patent
UNITED STATES PATENTS

| | | |
|---|---|---|
| 1,899,913 | McCuen | Feb. 28, 1933 |
| 2,643,111 | Burton | June 23, 1953 |
| 2,692,135 | Crane | Oct. 19, 1954 |
| 2,762,445 | Polhemus et al. | Sept. 11, 1956 |